US00RE34318E

United States Patent [19]

Davenport et al.

[11] E Patent Number: Re. 34,318

[45] Reissued Date of Patent: Jul. 20, 1993

[54] LIGHTING SYSTEMS EMPLOYING OPTICAL FIBERS

[75] Inventors: John M. Davenport, Lyndhurst; Richard L. Hansler, Pepper Pike, both of Ohio

[73] Assignee: General Electric Company, Schenectady, N.Y.

[21] Appl. No.: 666,118

[22] Filed: Mar. 6, 1991

Related U.S. Patent Documents

Reissue of:

[64] Patent No.: 4,811,172
Issued: Mar. 7, 1989
Appl. No.: 123,844
Filed: Nov. 23, 1987

[51] Int. Cl.[5] ..... B60Q 1/00

[52] U.S. Cl. ..... 362/61; 362/32; 362/80

[58] Field of Search ..... 362/32, 61, 80

[56] References Cited

U.S. PATENT DOCUMENTS

| | | | |
|---|---|---|---|
| 3,455,622 | 1/1969 | Cooper | 362/32 |
| 4,382,272 | 5/1983 | Quella et al. | 362/32 |
| 4,389,698 | 6/1983 | Cibie | 362/32 |
| 4,428,031 | 1/1984 | Mori | 362/32 |
| 4,430,692 | 2/1984 | Papadakis | 362/32 |
| 4,432,039 | 2/1984 | Cibie | 362/32 |
| 4,454,568 | 6/1984 | Stadnik | 362/32 |
| 4,464,705 | 8/1984 | Horowitz | 362/32 |

*Primary Examiner*—Ira S. Lazarus
*Assistant Examiner*—L. Heyman
*Attorney, Agent, or Firm*—George E. Hawranko; Stanley C. Corwin

[57] ABSTRACT

A lighting system particularly suite for aerodynamically styled automobiles and aircraft is disclosed. The lighting system emits light from a strip arranged across a vehicle such as the automobile. The lighting system may comprise various subsystems finding application for the high and low beam frontal illumination and rear illumination all of the automobile. Each of the subsystems comprises a high intensity light source coupled to one end of each of a plurality of light pipes or optical fibers with each having their other end preferably positioned relative to a reflective element and lens. The reflective elements are arranged relative to a lens element to provide a prescribed illumination patterns. In one embodiment the lenses are arranged relative to each other and are located across a strip of the automobile to provide a composite beam to serve the needs of the high and low beam illumination patterns for the automobile.

42 Claims, 5 Drawing Sheets

LIGHTING SYSTEMS EMPLOYING OPTICAL FIBERS

Matter enclosed in heavy brackets [ ] appears in the original patent but forms no part of this reissue specification; matter printed in italics indicates the additions made by reissue.

BACKGROUND OF THE INVENTION

The present invention relates to a lighting system. and more particularly, to a lighting system comprised of subsystems each utilizing a high brightness light source which is coupled to fiber optics so as to emit a desired illumination pattern form an optical strip arranged across a vehicle such as an automobile, truck, bus, van, tractor or aircraft.

It is well known that fiber optics may be used efficiently to carry or conduct the output of a light source to various locations without encountering any substantial transmission losses thereof. The light conducted by the optical fibers is confined or condensed to the relatively small dimensions of the fibers themselves and may find various related space restrictive applications in automobiles and aircraft or other vehicles concerned with aerodynamic styling and efficiency.

For example, automotive styling must take into account the amount of frontal area necessary to provide the forward illumination needs for the automobile and provide means to reduce that area, and in particular, the height so as to satisfy aerodynamic considerations. Similarly, it is desired that the exposed area of the automobile necessary to provide its rearward illumination, such as stop and tail license plate and back up illumination, be reduced so as to accommodate aerodynamic styling. Further, it is desired that the side illumination of a vehicle such as said markers be adapted to aerodynamic styling considerations. Still further, the interior lighting for a vehicle such as glove compartment and interior lights should be considered for styling and efficiency implications. The use of fiber optics that conduct light within small confines are adaptable to these aerodynamic considerations. Further, fiber optics are advantageously adaptable to provide the overall illumination needs of the vehicle.

One such aerodynamic consideration is to provide forward illumination by light generated at a remote location coupled by fiber optics and emitted from a relatively small optical strip arranged across the frontal area of the automobile. One of the major areas of concern in efficiently utilizing optical fibers is the coupling of a sufficient amount of energy from a light source into these optical fibers to serve the needs of the automobile, aircraft, or other vehicle in which the fibers are employed. The coupling of such energy is dependent upon the intensity of the light source, the size of the optical fibers, and the distance between them. Each of these parameters has certain limitations that hinder the employment of optical fibers for optical systems for vehicles, automobiles or aircraft. For example, forward illumination emitted from an optical strip spread across an automobile may require such an intensity light source that has relatively large dimensions, compared to conventional headlamps, that prevents it from being conveniently housed on an automobile. Further, the illumination must be of a prescribed amount and distribution to satisfy the forward and glare considerations of the automobile which may not be feasible by having the light emitted from a strip arranged across a vehicle, automobile or aircraft. It is desired that these limitations be reduced or even eliminated and that a lighting system be provided that has efficient coupling between the optical fibers and the light source, and further that illumination be provided that meets and exceeds the needs of the vehicle, automobile or aircraft.

Accordingly, it is an object of the present invention to provide means for efficient coupling between the fiber optics and light source of a lighting system.

It is a further object of the present invention to provide a lighting system employing optical fibers that provides desired illumination patterns of efficient amount and of prescribed patterns to meet and exceed the needs of the vehicle, automobile and aircraft.

SUMMARY OF THE INVENTION

The present invention is directed to a lighting system particularly suited to the aerodynamic considerations of vehicles, including automobiles, aircraft and the like to allow design flexibility and to provide an overall lighting system for the vehicle.

The lighting system includes subsystem each comprising a high intensity light source capable of being selectively energized and a plurality of optical carrying devices, preferably optical fibers, with each having one end predeterminedly coupled to the light source and the other end of each of the optical fibers preferably predeterminedly positioned in close proximity to respective reflective elements. Each of the reflective elements are respectively arranged with alens element capable of being mounted on an external surface of a device. The lens elements each provide a prescribed illumination pattern when the light source is activated.

In another embodiment of the subsystem, the optical fibers are routed directly to their respective lens elements thereby eliminating the need of the reflective elements. In either embodiment the optical fibers are predeterminedly positioned at the focal length of their respective lens elements.

One embodiment of the lighting system includes two subsystems each having a high intensity light source respectively coupled to one end of a first and second plurality of optical fibers. The other end of the first and second plurality of optical fibers are arranged so that one optical fiber form the first high intensity source is arranged with one optical fiber from the other high intensity source and both are positioned in close proximity to a reflective element. The reflective elements related to the first and second plurality of fibers are arranged relative to a first plurality of lens elements mounted across the frontal area of an automobile. The plurality of reflective elements are arranged relative to the optical fibers so as to direct the light from each of the high intensity sources into the lens elements so that upon the selective activation of either or both of the high intensity sources, the lens elements respectively provide the forward low and high beam illumination patterns for the automobile. In another embodiment of the lighting system, two subsystems develop the low and high beam illumination without the need of reflective elements.

DETAILED DESCRIPTION OF THE PREFERRED EMBODIMENT

Figure 1:
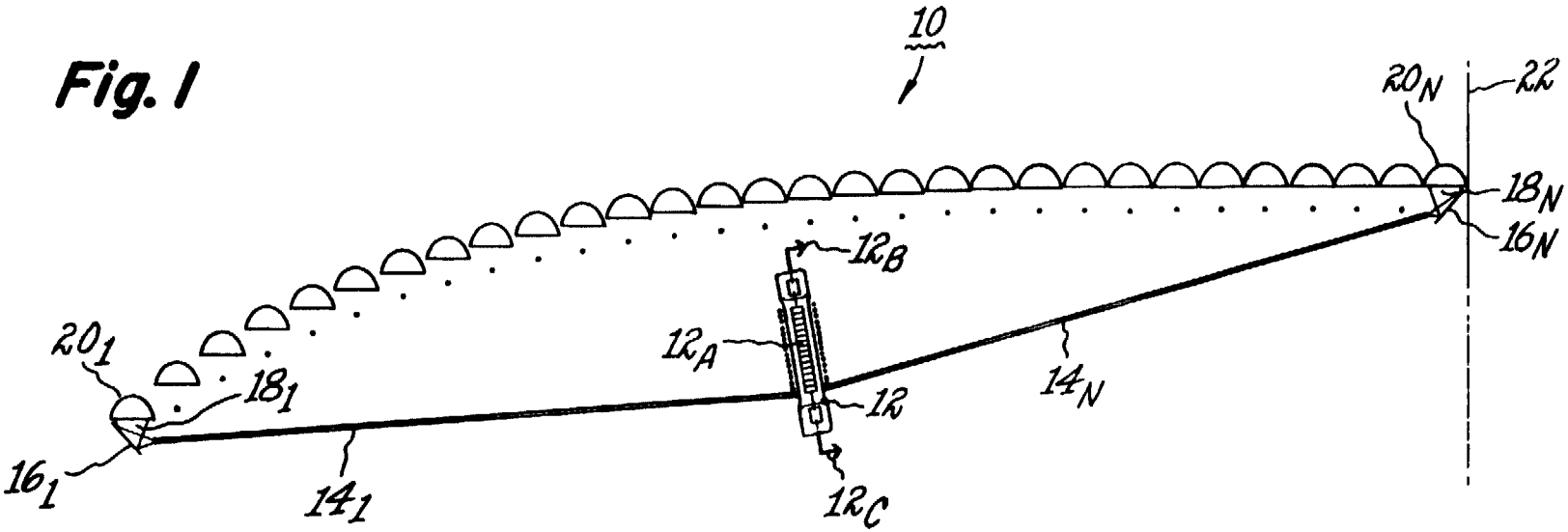
FIG. 1 is a schematic illustration of one embodiment of the present invention related to a lighting system that provides the forward illumination of a vehicle.

Referring to the drawing, FIG. 1 illustrates a subsystem 10 related to the overall lighting system of the present invention. The subsystem 10 illustrated in FIG. 1 for one embodiment of the present invention provides the forward illumination that is particularly suited for aerodynamically styled vehicles such as automobiles or aircrafts. The subsystem 10, along with other subsystems of the lighting system of the present invention, includes a high intensity light source 12 capable of being selectively energized, and a plurality of optical carrying devices such as optical fibers $14_1 \ldots 14_N$, each having one end predeterminedly coupled to the light source 12 with the other end of the optical fibers of the embodiment of FIG. 1 preferably predeterminedly positioned in close proximity to respective reflective elements $16_1 \ldots 16_N$. The reflective elements $16_1 \ldots 16_N$ are preferably provided to be advantageously positioned relative to fiber optics $14_1 \ldots 14_N$ so as to reduce or even eliminate any bending of fiber optics $14_1 \ldots 14_N$ that may adversely effect the light carrying capabilities of the fiber optics $14_1 \ldots 14_N$. The use of reflective elements $16_1 \ldots 16_N$ provide more flexibility relative to the routing of the fiber optic elements $14_1 \ldots 14_N$ within the confines of the vehicle, automobile and aircraft.

Each of the respective reflective elements $16_1 \ldots 16_N$ respectively direct light rays $18_1 \ldots 18_N$ into lens elements $20_1 \ldots 20_N$ which are capable of being mounted on the frontal area of a vehicle such as an automobile or air craft. The lens elements $20_1 \ldots 20_N$ have a circular shape when viewed from the front (not shown) and provide, as will be described, prescribed illumination patterns when the light source 12 is selectively activated.

The high intensity light source illustrated in FIG. 1 is a tubular-like device having an incandescent filament $12_A$ that may be selectively energized by an external source by way of terminals $12_B$ and $12_C$. The plurality of optical fibers $14_1 \ldots 14_{15}$ each have one of their ends coupled to one side of the high intensity source 12, whereas, the optical fibers $14_{16} \ldots 14_N$ each have one of their ends coupled to the other side of the high intensity light source 12. The other ends of the optical fibers $14_1 \ldots 14_N$, upon the activation of light source 12, each emit light that respectively impinges onto reflective element $16_1 \ldots 16_N$.

FIG. 1 shows an arrangement comprising thirty (30) of each of the optical fibers 14, reflective elements 16, and the lens elements 20. The lens elements 20 are positioned in a contoured manner across the left side of the frontal area (not shown) of a vehicle such as an automobile and up to the centerline 22 of the automobile. The automobile has a complementary arrangement of the subsystem 10 shown in FIG. 1 on the other side of the centerline 22 so that predetermined light patterns, to be described, are emitted from a relatively small optical strip exposed on and across the majority of the frontal surface of the automobile. The light developed by the subsystem 10 of FIG. 1 serves as the low beam illumination of an aerodynamically styled automobile.

Figure 2:
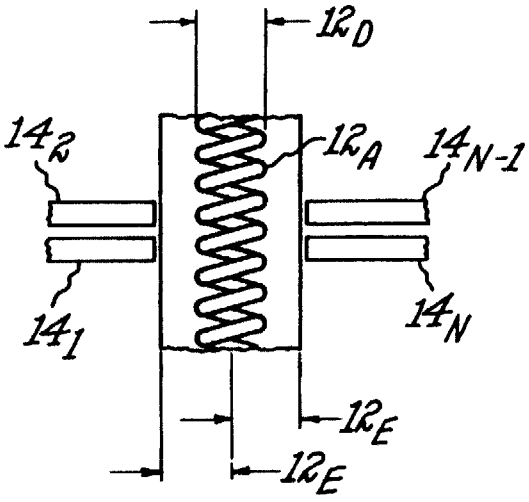
FIG. 2 illustrates the placement of a plurality of fiber optics relative to the filament of a relatively small high intensity light source.

The development of such low beam illumination may be described with reference to FIG. 2 showing a portion of the coupling of the high intensity incandescent light source 12 to a plurality of optical fibers. The high intensity light source 12 is preferably of a quartz material and consists of a quartz tubular member having a relatively small overall length of about 30 mm. a neck portion with a diameter of about 3 mm, and a central portion with an outer diameter of about 4 mm. The filament $12_A$ of light source has an outer diameter dimension $12_D$ of about 1.8 mm. The central portion of the filament $12_A$ is spaced from the outer walls of the light source 12 by an amount $12_E$ having a value of about 1.6 mm. The light source 12 has a relatively large length to diameter ratio such as 30 to 4. The light source 12, having relatively small dimensions, upon its selective activation by the automotive switching system, yields a high intensity light output of about 2000 lumens.

Figure 3:
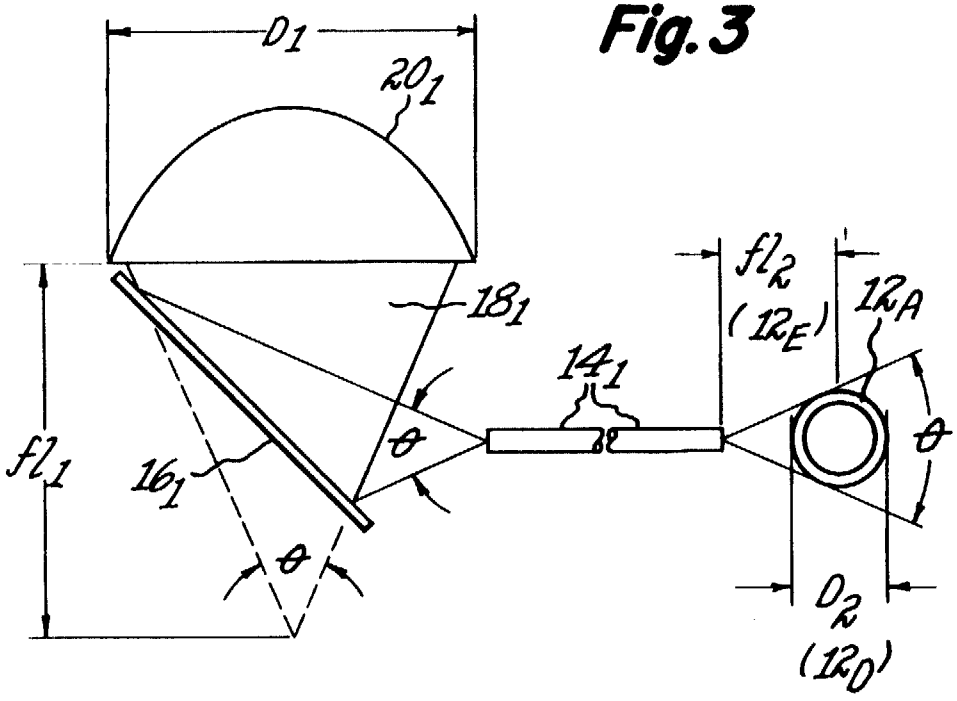
FIG. 3 is a schematic illustration of the parameters related to the transmission of the light output from a portion of the high intensity light source to one of the optical lenses illustrated in FIG. 1.

The optical fibers shown in FIG. 2 have a diameter of about 1.5 mm and are preferably formed of a high temperature material such as quartz or glass to allow the fibers to be brought into close proximity with and even directly contacting the relatively hot operating high intensity light source 12 as shown in FIG. 2. The fibers of 1.5 mm diameter are arranged in line almost touching each other and almost touching the light source while extending about 25 mm along each side of the light source. The other end of each of the optical fibers, such as the other end of fiber $14_1$, shown in FIG. 3, are predeterminately positioned relative to a reflective member, such as $16_1$ related to fiber $14_1$. The reflective members, such as $16_1$, may have an aluminized reflective surface and dimensions of $4 \times 8$ mm.

FIG. 3 shows a portion of slice, in the vertical plane, of the filament $12_A$ related to optical fiber $14_1$ looking down into the high intensity light source 12. The previously discussed dimensions $12_D$ and $12_E$ of source 12 are respectively shown in FIG. 3 as diameter $D_2$ and focal length $Fl_2$. The angle at which the light rays emitted by the filament 12 enter the optical fiber 14, in the vertical direction is shown as $\theta$. Considering the previously given dimensions ($12_D = 1.8$ mm and $12_E = 1.6$ mm) yields an angle $\theta$ of about 54° but this angle $\theta$ may be of an amount form about 40° to about 60°. It is preferred that the optical fiber $14_1 \ldots 14_N$ be positioned relative to the filament having a predetermined diameter so that the spacing between the optical fibers and the mid-portion of the filament is approximately equal to the predetermined diameter of the filament. This angle $\theta$ is also that of the light rays exiting the optic fiber $14_1$ and impinging the reflective element $16_1$. Further the angle $\theta$ is also the angle which defines the cone of light $18_1$ directed to the related lens element $20_1$.

The angle $\theta$ is also representative of the f/number of the lens element $20_1$ which may be expressed by the relationship: where $fl_1$ is the focal length of the lens element $20_1$, and $D_1$ is the diameter of the lens element $20_1$.

The lens $20_1$, has a focal length fl, preferably in the range of 15 to 30 mm. The lens element $20_1$ may be an aspheric lens which corrects for spherical aberration. Such an aspheric lens is particularly suited for small f/number such as 0.06 to 1. The lens $20_1$ may also be a fresnel type particularly suited for small f/numbers applications. Both the aspheric and fresnel lenses may be molded from plastic and are preferably formed in one continuous strip of thirty (30) with each of such lenses having a length and a width of about one (1) inch. For the embodiment of FIG. 1, the composite strip of lenses $20_1...20_N$ is molded such that it conforms to the shape of the front end of an automobile or an airplane and the lenses are oriented so as to direct the light in a forward direction. The composite strip of lenses may also have on its outer surface a clear flat plastic which conforms to the outer metal surfaces and may provide a window through which light emitted by the subsystem of FIG. 1 passes.

The coupling of the light from the high intensity light source 12 to the plurality of optical fibers $14_1...14_N$ is dependent upon the size or lumen output of the light source, the size of the fiber, and the distance between the fiber and the light source. For a small spherical light source and optical fiber, the coupled light will vary as the square of the distance between the source and the fibers. For the incandescent light source 12 having a large length to diameter ratio, the amount of light collected by the fibers essentially varies inversely as the first power of the distance between the source and the fibers. Accordingly, the closer the fibers can be brought to the filament of the light source the more light that will be collected by the fibers themselves. This is achieved by the present invention in which the fibers are preferably brought into direct contact with the outer walls of the light source as shown in FIG. 2.

The angle $\theta$ at which the light rays enter the optical fibers $14_1...14_N$, previously discussed, is about 60° total angle in the vertical direction. This same angle is preserved in the light emitted by the fibers and essentially all such light is collected by the lens and collimated thereby. In the horizontal plane the fiber receives light from the whole length of the filament. This light is lost when it emerges from the fibers since it will not strike the reflective elements $16_1...16_N$ and therefore is not directed to the lenses $20_1...20_N$ but rather is absorbed in baffles positioned between the lenses $20_1...20_N$.

Figure 4:
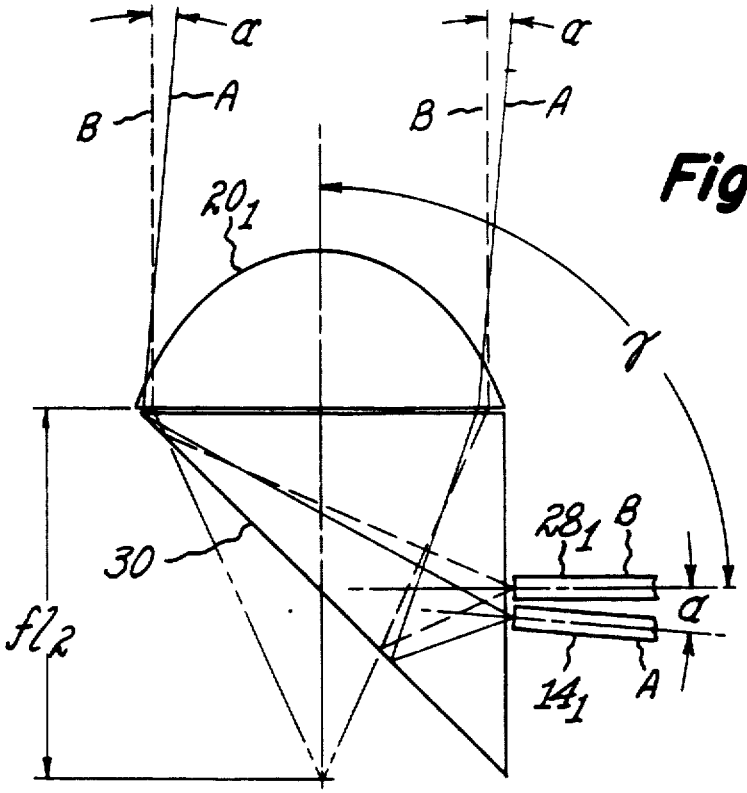
FIG. 4 illustrates the directing and combining of the illumination from a first and a second high intensity light source by a reflective element into one of the optical lenses shown in FIG. 1.

The beam of light developed by the practice of this invention and which emerges from the lenses, as to be further discussed with regard to FIG. 4, is from about 3° to about 6° total angle depending on the diameter of the fiber and the focal length of the lens. For the arrangement shown in FIG. 3 that produces a beam in the form of a circle of 3.4°, the planar reflective element 16 is disposed as close as possible to the fiber optics and is tilted at an angle such as to center the image of the end of the fiber on the axis of the lens is at a distance equal to the focal length $fl_2$ of the lens.

For the embodiment disclosed with regard to FIG. 3, the amount of light collected by each of the optical fibers is about 15 lumens. Considering that there are thirty (30) optical fibers associated with the light source 12 as shown in FIG. 1, the amount of lumen output developed by the present invention is $30 \times 15 = 450$ lumens which when coupled with the light from the unit on the other side having the embodiment shown in FIG. 1, provides the low beam illumination needs of an automobile.

The size of the beam produced by the focus of light emitted by optics that intercepts the respective reflective element and which impinges onto and is transmitted by the lens should also take into account the parameters of the lens itself. The size of the beam produced by a lens having a focal length of 25 mm developed from a fiber optical having a diameter of 1.5 mm is $=1.5/25$ which is equal to 0.06 radians which may be expressed as 3.4 degrees. Each of the fiber optics lens combinations ($14_1...14_N$, and $20_1...20_N$) produces a uniform circle of light with a well defined edge where the angle between the edges is 3.4°. For a lens 20 having a focal length of 20 mm formed from the light emitted from 1.5 mm fiber, the angle produced is 4.3°. This is still an acceptable small angle for the automotive application. The desired light pattern emitted from the plurality of lenses 20 is produced by overlapping the light circles produced by the plurality of lenses. Because of the sharply defined light circle of each lens, the overall light pattern has a minimum glare factor and since there is virtually no uncontrolled light, the forward illumination of the automobile is particularly suited for low beam applications for driving in fog, rain or snow.

To provide for both the low and the high beam illumination of an automobile, two high intensity lamps and two sets of a plurality of optic fibers may be used and may be described with reference to FIG. 4 shows fiber optic $14_1$, also indicated as A, related to the first light source 12 and fiber optics $28_1$, also indicated as B, which is one of a plurality of fiber optics each having one of their ends coupled to a second light source (not shown) in a manner as described with regard to FIGS. 2 and 3 related to fiber optics $14_1...14_N$. Each of the fiber optics A and B are positioned in close proximity to each other and at angles $\alpha$ and $\gamma$, respectively, relative to the center line of the lens, $20_1$. Reflective element 30 is a 90° prism molded from plastic in which total internal reflection occurs to deflect the light.

The fiber optics A is positioned at the angle relative to the centerline which is approximately 3–5°. The fiber optic B is positioned on the optical axis. The light rays emitted by fiber optic A which impinge and are reflected and directed by element 30 to lens $20_1$ are indicated as A, whereas, similar rays related to fiber optic B are indicated as B. The light rays A shown being transmitted by lens $20_1$ are parallel to each other, and similarly, the light rays B transmitted by lens $20_1$ are parallel to each other. The fiber optic B is positioned on-axis, that is $\gamma = 90°$, relative to lens $20_1$. The fiber optic A is positioned off-axis about 3° to 5° so as to provide light transmitted from lens $20_1$ shifted to the left and above the light rays B. The light rays B provide the low beam illumination of the automobile, whereas, light rays A provide the high beam illumination of the automobile.

The operation of the arrangement shown in FIG. 4 produces a proper light beam pattern for both the high and low illumination of the automobile. The centers of the two patterns respectively produced by each high intensity light sources related to the two plurality of optical fibers $14_1...14_N$ and $28_1...28_N$ are limited approximately to a separation of about 3° to about 5° if the ends of the fibers are placed next to each other relative to the respective reflective elements. Because the two beams are developed from separate light sources both beams upon the proper selection of the automotive switching system may be used separately or together to provide the high beam frontal illumination for vehicles, automotives and aircraft under consideration. If desired, light filtering, for example, between the reflective element and the lens, may be provided so as to develop some color, such as yellow, in the high beam illumination which finds adaptation in some countries such as France. This light filtering may also be used for the low beam applications.

Figure 5:
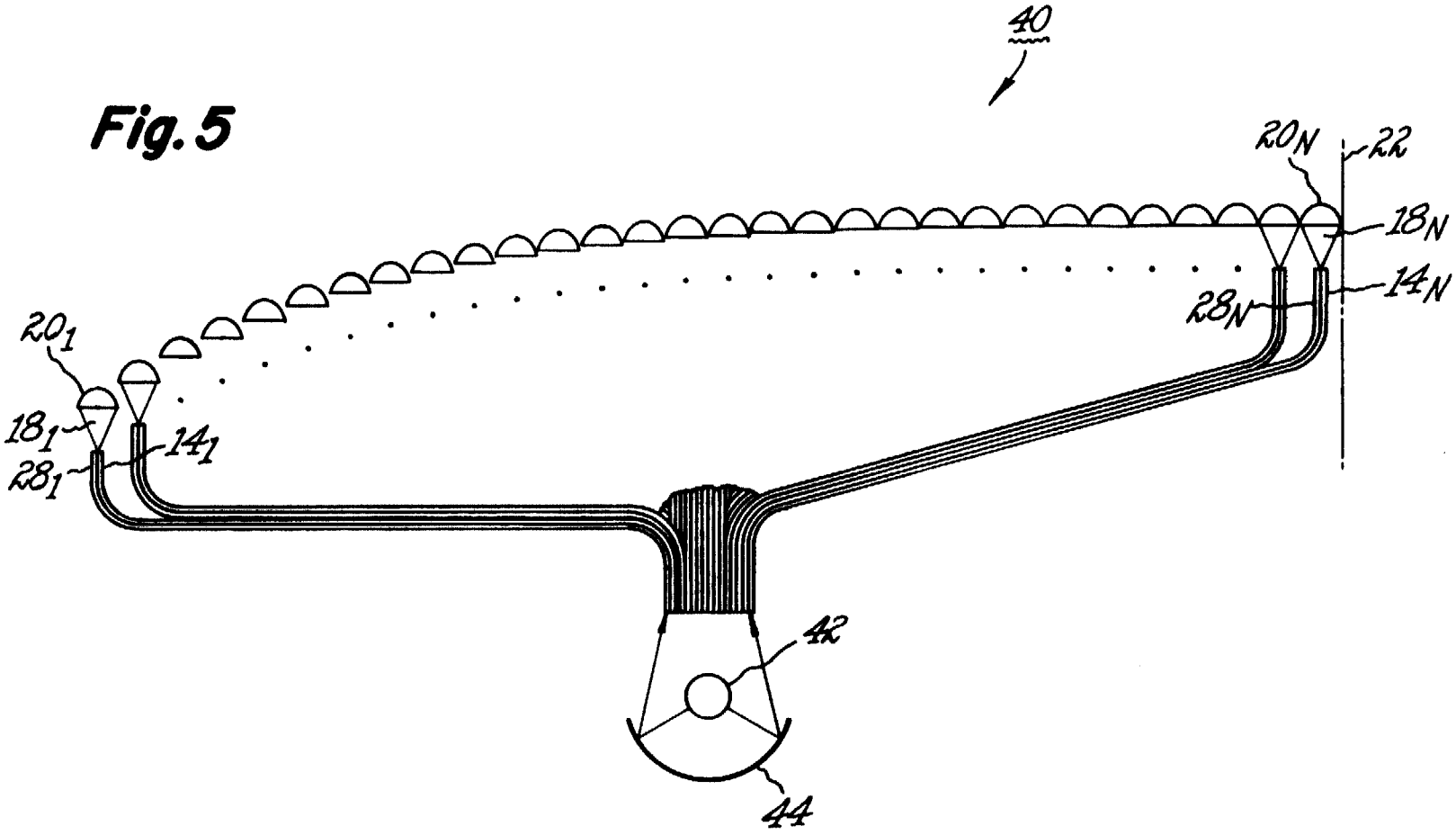
FIG. 5 is a schematic illustration of a lighting system that provides the forward illumination of a vehicle utilizing a high intensity light source coupled to a plurality of optical fibers by means of a ellipsoidal reflector.

A second embodiment of the present invention of a lighting subsystem 40 is shown in FIG. 5 as having a plurality of lens $20_1 \ldots 20_N$ arranged in a contoured manner on each side of the automobile in a manner as described with regard to FIG. 1. The subsystem 40 of FIG. 5 is different from that of subsystem 10 of FIG. 1 in that it is devoid of reflective elements allowing the light output $18_1 \ldots 18_N$ from fiber optics $14_1 \ldots 14_N$ and $28_1 \ldots 28_N$ to be respectively routed directly to lens elements $20_1 \ldots 20_N$. Further, the light coupled to the fiber optics $14_1 \ldots 14_N$ related to the low beam illumination, is generated by a first high intensity light source 42 arranged in one embodiment at one focue of an elliptical reflector 44 in a manner as to be described with regard to FIG. 7. The light coupled to the fiber optics $28_1 \ldots 28_N$, related to the high beam illumination, is generated by a second high intensity light source (not shown) in a manner similar to that of elliptical reflector 44. The manner in which light emitted by fiber optics $14_1 \ldots 14_N$ and $28_1 \ldots 28_N$ is combined and collimated by lens elements $20_1 \ldots 20_N$ may be described with regard to FIG. 6.

Figure 6:
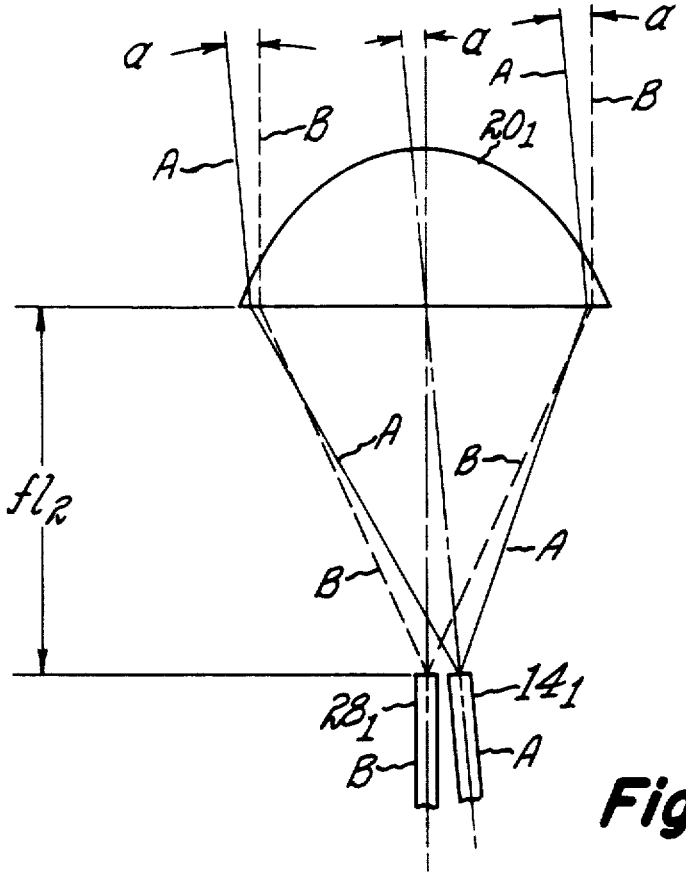
FIG. 6 illustrates the directing and combining of the illumination from a first and a second high intensity light source, without the use of a reflective element, into one of the optical lenses of FIG. 1.

In a manner similar to FIG. 4, FIG. 6 shows the fiber optics $14_1$ and $28_1$ positioned along and at a distance equal to the focal length $fl_2$ of the lens $20_1$. FIG. 6 also shows the central portion of the fiber optics $28_1$(B), related to the high beam illumination, arranged on-axis of lens element $20_1$, whereas, the central portion of the fiber optics $14_1$ (A) is arranged off-axis of lens element $20_1$ by an angle having the typical value of about 3° to about 5°. Further, the light rays shown in FIG. 6 transmitted from fiber optics $14_1$ and collimated by lens $20_1$ are indicated by A and are parallel to each other. Similarly, the light rays transmitted from fiber optics $28_1$ and collimated by lens $20_1$ are indicated by B and are parallel to each other. The operation of the arrangement of FIG. 6 develops separately or together light beam patterns that are separated from each other by an angle limited approximately to a value of about 3.4° so as to provide the low and high beam illumination for the vehicle, automobile or aircraft employing this invention in a similar manner as described with regard to FIG. 4.

The arrangement of the first high intensity light source 42 positioned at one focus of elliptical reflector 44 related to one embodiment of the present invention and coupled to fiber optics $14_1 \ldots 14_N$ along with the second high intensity light source (not shown) coupled to fiber optics $28_1 \ldots 28_N$ may be described with reference to FIG. 7. The exposed faces of the plurality of fibers $14_1 \ldots 14_N$ and also the faces of the fibers $28_1 \ldots 28_N$ (not shown) are arranged at the second focus of the elliptical reflector 44. The high intensity light source 42 may be of an incandescent type previously discussed with regard to light source 12 or it may be a discharge lamp comprised of spaced apart electrodes and having a metallic or metal halide ingredient along with a gaseous fill. The discharge lamp 42 preferably has a light output of 2000 lumens. The discharge lamp 42 is preferably of a miniature type such as described in U.S. Pat. No. 4,161,672, assigned to the same assignee as the present invention, incorporated herein by reference and to which reference may be made for further details of its operation. The elliptical reflector 44 is preferably of a type described in U.S. Pat. No. 4,021,659, assigned to the same assignee as the present invention, incorporated herein by reference and to which reference may be made for further details of its operation.

Figure 7:
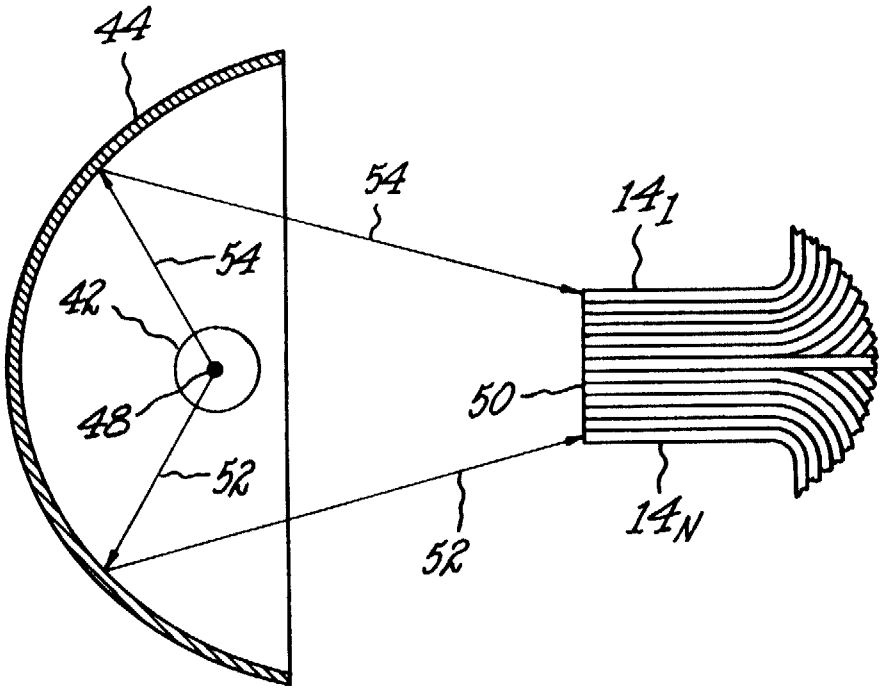
FIG. 7 illustrates the ellipsoidal reflector focusing of the light rays emitted from a high intensity source into the plurality of optical fibers.

In the operation of the arrangement of FIG. 7, the placement of the central portion of the light source 42 at one focal point 48 of reflector 44 and the bundle of optical fibers at the other focal point of reflector 44, causes the vast majority of the light rays, such as rays 52 and 54, emitted by light source 42 to be intercepted and reflected by reflector 44 so as to enter the exposed faces of the plurality of optical fiber $14_1 \ldots 14_N$ at the desired angle $\theta$ of about 54° having a range of about 40° to about 60° previously discussed with regard to FIG. 3. The operation of the arrangement of FIG. 6 is advantageous in that it eliminates the need of bringing the optical fibers into close proximity with the light source 42, while at the same time, providse sufficient couplling from the light source 42 to the optical fibers so as to provide the desired low beam and high beam illumination for the automobile or aircraft in a manner as described with regard to FIGS. 4 and 6. The ability of locating light source 42 remotely from the fiber optics $14_1 \ldots 14_N$ also allows flexibility in locating and routing of the fiber optics within the housing, such as the automobile or aircraft, so as to minimize or eliminate any bending of the fiber optics $14_1 \ldots N_N$ and thereby eliminating the need of reflective elements $16_1 \ldots 16_N$ described with regard to FIG. 1.

It should now be appreciated that the arrangements of the embodiments of FIGS. 5 and 1 provide for subsystems 40 and 10, respectively, that are particularly suited for aerodynamically styled vehicles, automobiles or aircraft. The practice of the present invention provides a means of coupling a sufficient amount of light from the light source to the optical fibers so as to provide for the overall illumination needs of the aerodynamically styled vehicles, automobiles and aircraft. The illumination provided by the practice of the present invention more than satisfies the low and the high beam needs of the aerodynamically styled automobile.

One or more of the subsystems 40 or 10 may be interconnected to comprise the overall lighting system for various applications finding applicability for the aerodynamically designed, vehicle, automobile and aircraft. In such a lighting system the high intensity light source of the subsystem may be energized to serve the illumination needs for any particular application. The lens of the subsystem may be located and directed to emit light in a desired beam pattern and at a particular level of intensity. For example, the subsystem of the present invention may be employed to provide for the rearward illumination of a vehicle, such as stop and tail light, license plate, and back up applications. For such usage, the light source is selectively activated by the automotive switching subsystem and the lens members are appropriately mounted on the desired rear portions of the automobile. For the rearward illumination, only one optical fiber for each light source is necessary to conduct the light to the appropriate lens element. The subsystem of the present invention may also find application to serve the needs of the interior of a vehicle such as the interior and glove compartment illumination. Similarly, the practice of the present invention provides for lighting for other vehicle or aircraft needs, such as side illumination of a vehicle of landing lights and marker lights, in thin winged planes. Further, the practice of the present invention may also provide the desired illumination for sign lighting and other lighting applications.

The practice of the present invention may provide for all of the illumination needs of vehicles, automobiles or aircraft. The invention contemplates that one or more high intensity light sources may be appropriately housed within the vehicle, automobile or aircraft and its light output distributed throughout by means of fiber optic elements to the appropriately positioned lens elements. The activation of the one or more high intensity light sources along with the lens element may be accomplished by appropriate switching means of the vehicle, automobile or aircraft in which the invention finds application.

Although the previous description related to FIG. 1 was discussed as having a reflective element for directing the light from an optical fiber into the lens elements situated on a housing, it should be recognized that the practice of the present inventioon contemplates that the optical fiber discussed with regard to FIG. 1 could be routed directly to the lens element and thereby eliminate the need of the reflective elements shown in FIG. 1. Further, it should be recognized that the optical fiber could be routed directly to an appropriate housing and eliminate the need of both the reflective and lens elements.

It should now be appreciated that the practice of the present invention provides a means of producing controlled light patterns initiated from one or more high intensity light sources which are effectively coupled to one end of a plurality of optical fibers that can either be brought into close proximity to the light source or the fibers may be located remotely from the light source by means such as a focussing elliptical reflector. The other ends of the fibers then serve as a secondary light source for the optical systems having other means to combine and collimate the light rays of the light source into one or more desired light patterns to serve the needs of the aerodynamically designed vehicles, automobiles or aircrafts.

What we claim as new and desire to secure by Letters Patent of the United States is:

1. A lighting subsystem for a vehicle comprising:
(a) a high intensity light source capable of being selectively energized, said high intensity light source having a filament disposed therein with a predetermined diameter; and
(b) a plurality of optical carrying devices each having one end predeterminedly coupled to said light source so that the spacing between the ends of the optical carrying devices fibers and the filaments is approximately equal to said diameter of said filament, said optical carrying devices each having their other end mountable in the frontal area of said vehicle, said optical carrying devices providing the frontal illumination pattern of said vehicle when said light source is activated.

2. A lighting subsystem for a vehicle comprising:
(a) high intensity light source capable of being selectively energized, said high intensity light source having a filament disposed therein with a predetermined diameter; and
(b) a plurality of optical carrying devices each having one end predeterminedly coupled to said light source so that the spacing between the ends of the optical carrying devices and the filament is approximately equal to said diameter of said filament, said optical carrying devices each having their other end mountable within the interior of said vehicle, said optical carrying devices providing interior illumination for said vehicle when said light source is activated.

3. A lighting subsystem according to claim 1 comprising:
(a) said high intensity light source capable of being selectively energized;
(b) said plurality of optical carrying devices each having one end predeterminedly coupled to said light source with the other end of each said optical carrying devices predeterminedly positioned relative to a respective reflective element;
(c) each of said respective reflective elements being respectively arranged with a lens element capable of being mounted on a device; and
(d) said lens elements each providing a prescribed illumination pattern when said light source is activated.

4. A lighting system for an automobile comprising a first, a second, a third, and a fourth lighting subsystem each according to claim 3 and further comprising;
(a) said first subsystem comprising a first high intensity light source capable of being selectively energized and coupled to one end of each of a first plurality of optical fibers;
(b) said second subsystem comprising a second high intensity light source capable of being energized and coupled to one end of each of a second plurality of optical fibers;
(c) said third subsystem comprising a third high intensity light source capable of being selectively energized along with said first high intensity light source and coupled to one end of each of a third plurality of optical fibers;
(d) said fourth subsystem comprising a fourth high intensity light source capable of being energized along with said second light source and coupled to one end of each of a fourth plurality of optical fibers;
(e) a first plurality of reflective elements predeterminedly and respectively located relative to the other ends of said first and third plurality of optical fibers;
(f) a second plurality of reflective elements predeterminendly and respectively located relative to the other ends of said second and fourth plurality of optical fibers;
(g) a first plurality of lens elements predeterminedly and respectively located relative to said first plurality of reflective elements so as to provide a predetermined illumination pattern upon the energization of either or both of said first and third light sources, said first plurality of lens elements being mountable across a portion of the frontal area of said automobile;
(h) a second plurality of lens elements predeterminedly and respectively located relative to said second plurality of reflective elements so as to provide a predetermined illumination pattern upon the energization of either or both of said second and forth light sources, said second plurality of lens elements being mountable across another portion of said frontal area of said automobile; and (i) said first and second plurality of lens elements being effective for providing the forward illumination for said automobile upon the energization of either or all of said first, second, third and fourth light sources.

5. A lighting system for an automobile comprising a first and a second lighting subsystem each according to claim 3 and further comprising;

(a) said first subsystem comprising a first high intensity light source capable of being selectively energized and coupled to one end of at least one first optical fiber;

(b) said second lighting subsystem comprising a second high intensity light source capable of being selectively energized and coupled to one end of at least another optical fiber;

(c) at least one reflective element predeterminedly located relative to the other end of said at least one optical fiber;

(d) a second reflective element predeterminedly located relative to the other end of said at least another optical fiber;

(e) at least one lens element predeterminedly located relative to aid at least one reflective element so as to provide a desired illumination pattern upon the energization of the first light source, said at least one lens being mountable at one side of the rear section of an automobile;

(f) at least another lens element predeterminedly located relative to said at lest another reflective element so as to provide a predetermined illumination pattern upon the energization of the second light source, said at least another lens element being mountable at the other rear section of said automobile; and (g) said at least one and said at least another lens elements being effective for providing rearward illumination of said automobile.

6. A lighting system for an aircraft comprising a first, a second, a third, and a fourth lighting subsystem each according to claim 3 and further comprising;

(a) said first subsystem comprising a first high intensity light source capable of being selectively energized and coupled to one end of each of a first plurality of optical fibers;

(b) said second subsystem comprising a second high intensity light source capable of being energized and coupled to one end of each of a second plurality of optical fibers;

(c) said third subsystem comprising a third high intensity light source capable of being selectively energized along with said first high intensity light source and coupled to one end of each of a third plurality of optical fibers;

(d) said fourth subsystem comprising a fourth high intensity light source capable of being energized along with said second light source and coupled to one end of each of a fourth plurality of optical fibers;

(e) a first plurality of reflective elements predeterminedly and respectively located relative to the other ends of said first and third plurality of optical fibers;

(f) a second plurality of reflective elements predeterminedly and respectively located relative to the other ends of said second and fourth plurality of optical fibers;

(g) a first plurality of lens elements predeterminedly and respectively located relative to said first plurality of reflective elements so as to provide a predetermined illumination pattern upon the energization of either or both of said first and third light sources, said first plurality of lens elements being mountable across a portion of the frontal area of an aircraft;

(d) a second plurality of lens elements predeterminedly and respectively located relative to said second plurality of reflective elements so as to provide a predetermined illumination pattern upon the energization of either or both of said second and fourth light sources, said second plurality of lens elements being mountable across another portion of said frontal area of said aircraft; and (i) said first and second plurality of lens elements being effective for providing the forward illumination of said aircraft upon the energization of either or all of said first, second, third and fourth light sources.

7. A lighting system for an aircraft comprising a first and a second lighting subsystem each according to claim 3 and further comprising;

said first subsystem comprising a first high intensity light source capable of being selectively energized and coupled to one end of each of a first plurality of optical fibers;

(b) said second lighting subsystem comprising a second high intensity light source capable of being selectively energized and coupled to one end of each of a second plurality of optical fibers;

(c) a first plurality of reflective elements predeterminedly located relative to the other end of said first plurality of optical fibers;

(d) a second plurality of reflective elements predeterminedly located relative to the other end of said second plurality of optical fibers;

(e) a first plurality lens elements predeterminedly located relative to said first plurality of reflective elements so as to provide a desired illumination pattern upon the energization of the first light source, said first plurality of lens elements being mountable at one side of an aircraft;

(f) a second plurality of lens elements predeterminedly located relative to said second plurality of reflective elements so as to provide a predetermined illumination pattern upon the energization of the second light source, said second plurality of lens elements being mountable at the other side of said aircraft; and (g) said first and second plurality of lens elements being effective for providing the marker light illumination of said aircraft.

8. A display lighting system comprising;

(a) a high intensity light source capable of being selectively energized, said high intensity light source having a filament disposed therein with a predetermined diameter; and (b) plurality of optical carrying devices each having one end predeterminedly coupled to said light source so that the spacing between the ends of the optical carrying devices fibers and the filament is approximately equal to said diameter of said filament, said optical carrying devices each having one end predeterminedly coupled to said light source with the other end of each said optical carrying devices predeterminedly positioned relative to a respective reflective element;

(c) each of said respective reflective elements being respectively arranged with a lens element capable of being mounted on a device; and (d) said lens elements each providing a prescribed illumination pattern when said light source is activated, said lens element being further arranged relative to each other to provide illumination for a desired sign configuration.

9. A lighting subsystem according to claim 1 comprising:

(a) said high intensity light source capable of being selectively energized;

(b) said plurality of optical carrying devices each having one end predeterminedly coupled to said light source with the other end of each optically carrying device predeterminedly positioned relative to respective lens elements capable of being mounted on a device; and (c) said lens elements each providing a prescribed illumination pattern when said light source is activated.

10. A lighting system for an automobile comprising a first, a second, a third, and a fourth lighting subsystem each according to claim 9 and further comprising;

(a) said first subsystem comprising a first high intensity light source capable of being selectively energized and coupled to one end of each of a first plurality of optical fibers;

(b) said second subsystem comprising a second high intensity light source capable of being energized and coupled to one end of each of a second plurality of optical fibers;

(c) said third subsystem comprising a third high intensity light source capable of being selectively energized along with said first high intensity light source and coupled to one end of each of a third of plurality of optical fibers;

(d) said fourth subsystem comprising a fourth high intensity light source capable of being energized along with said second light source and coupled to one end of each of a fourth plurality of optical fibers;

(e) a first plurality of lens elements predeterminedly and respectively located relative to said first and third plurality of optical fibers elements so as to provide a predetermined illumination pattern upon the energization of either or both of said first and third light sources, said first plurality of lens elements being mountable across a portion of the frontal area of said automobile;

(f) a second plurality of lens elements predeterminedly and respectively located relative to said second and fourth plurality of optical fibers so as to provide a predetermined illumination pattern upon the energization of either or both of said second and fourth light sources, said second plurality of lens elements being mountable across another portion of said frontal area of said automobile; and (g) said first and second plurality of lens elements being effective for providing the forward illumination for said automobile upon the energization of either or all of said first, second, third and fourth light sources.

11. A lighting system for an automobile comprising a first and a second lighting subsystem each according to claim 9 and further comprising;

(a) said first subsystem comprising a first high intensity light source capable of being selectively energized and coupled to one end of at least one optical fiber;

(b) said second lighting subsystem comprising a second high intensity light source capable of being selectively energized and coupled to one end of at least another optical fiber;

(c) at least one lens element predeterminedly located relative to said at least one optical fiber so as to provide a desired illumination pattern upon the energization of the first light source, said at least one lens element being mountable at one side of the rear section of said automobile; and (d) at least another lens element predeterminedly located relative to said at leas another optical fiber so as to provide a predetermined illumination pattern upon the energization of the second light source, said at least another lens element being mountable at the other rear section of said automobile; and (e) said at least one and said at least another lens elements being effective for providing the rearward illumination of said automobile.

12. A lighting system for an aircraft comprising a first, a second, a third, and a fourth lighting subsystem each according to claim 9 and further comprising;

(a) said first subsystem comprising a first high intensity light source capable of being selectively energized and coupled to one end of each of a first plurality of optical fibers;

(b) said second subsystem comprising a second high intensity light source capable of being energized and coupled to one end of each of a second plurality of optical fibers;

(c) said third subsystem comprising a third high intensity light source capable of being selectively energized along with said firs high intensity light source and coupled to one end of each of a third of plurality of optical fibers;

(d) said fourth subsystem comprising a fourth high intensity light source capable of being energized along with said second light source and coupled to one end of each of a fourth plurality of optical fibers;

(e) a first plurality of lens elements predeterminedly and respectively located relative to said first and third plurality of optical fibers so as to provide a predetermined illumination pattern upon the energization of either or both of said first and third light sources, said first plurality of lens elements being mountable across a portion of the frontal area of an aircraft;

(f) a second plurality of lens elements predeterminedly and respectively located relative to said second and fourth plurality of optical fibers so as to provide a predetermined illumination pattern upon the energization of either or both of said second and fourth light sources, said second plurality of lens elements being mountable across another portion of said frontal area of said aircraft; and (g) said first and second plurality of lens elements being effective for providing the forward illumination for said aircraft upon the energization of either or all of said first, second, third and fourth light sources.

13. A lighting system for an aircraft comprising a first and a second lighting subsystem each according to claim 9 and further comprising;

(a) said first subsystem comprising a first high intensity light source capable of being selectively energized and coupled to one end of each of a first plurality of optical fibers;

(b) said second lighting subsystem comprising a second high intensity light source capable of being selectively energized and coupled to one end of each of a second plurality of optical fibers;

(c) a first plurality lens elements predeterminedly located relative to said first plurality of optical fibers so as to provide a desired illumination pattern upon the energization of the first light source, said first plurality of lens elements located at one side of an aircraft;

(d) a second plurality of lens elements predeterminedly located relative to said second plurality of optical fibers so as to provide a predetermined illumination pattern upon the energization of the second light source, said second plurality of lens elements being mountable at the other side of said aircraft; and (e) said first and second plurality of lens elements being effective for providing the marker light illumination of said aircraft.

14. A display sign lighting system comprising;

(a) a high intensity light source capable of being selectively energized, said high intensity light source having a filament disposed therein with a predetermined diameter; and (b) a plurality of optical carrying devices each having one end predeterminedly coupled to said light source so that the spacing between the ends of the optical carrying devices fibers and the filament is approximately equal to said diameter of said filament, said optical carrying devices each having one end predeterminedly coupled to said light source with the other end of each optically carrying device predeterminedly positioned relative to respective lens elements capable of being mounted on a device; and (c) said lens elements each providing a prescribed illumination pattern when said light source is activated, said lens elements being further arranged relative to each other to provide illumination for a desired sign configuration.

15. A lighting subsystem in accordance with claim 3 wherein said plurality of optical carrying devices comprise optical fibers.

16. A lighting subsystem in accordance with claim 15 wherein said plurality of optical fibers comprise thirty (30) optical fibers and each have a diameter of about 1.5 mm.

17. A lighting subsystem in accordance with claim 16 wherein said light source comprises an incandescent filament having a outer diameter of 1.8 mm, a filament tube having a central portion of about 4.0 mm, a light output of about 2000 lumens and a length to diameter ratio of about 30 to about 4.

18. A lighting subsystem in accordance with claim 3 wherein said high intensity light source is an incandescent filament tube.

19. A lighting subsystem in accordance with claim 17 wherein said plurality of optical fibers are in direct contact with the incandescent high intensity light source.

20. A lighting subsystem in accordance with claim 3 wherein said lens elements are of a fresnel type lens having an F/number in the range of about 0.6 to about 1.0.

21. A lighting subsystem in accordance with claim 3 wherein said lenses are formed of a plastic material and arranged in a strip that is conformable to the shape of the front end of an automobile.

22. A lighting subsystem in accordance with claim 3 wherein the central portion of said reflective elements are predeterminedly positioned so that the end of the fiber optics are at a distance from the lens equal to the focal length of their respective lens elements.

23. A lighting subsystem in accordance with claim 9 wherein said plurality of optical carrying devices comprise optical fibers.

24. A lighting subsystem in accordance with claim 9 wherein said plurality of optical fibers consist of thirty (30) optical fibers each have a diameter of about 1.5 mm.

25. A lighting subsystem in accordance with claim 9 wherein said light source comprises an incandescent filament having an outer diameter of 1.8 mm, a filament tube having an outer diameter of about 4.0 mm, a light output of about 2000 lumens and a length to diameter ratio of about 30 to about 4.

26. A lighting subsystem in accordance with claim 9 wherein said high intensity light source is an incandescent filament tube.

27. A lighting subsystem in accordance with claim 23 wherein said plurality of optical fibers are in direct contact with said high intensity light source.

28. A lighting subsystem according to claim 26 wherein said light source is remotely located from said fiber optics and its light output is coupled to said optical fibers by means of an elliptical reflector.

29. A lighting subsystem in accordance with claim 9 wherein said lens elements are of a fresnel type lens having an F/number in the range of about 0.6 to about 1.0.

30. A lighting subsystem in accordance with claim 9 wherein said lenses are formed of a plastic material and arranged in a strip that conforms to the shape of the front end of the vehicle.

31. A lighting subsystem in accordance with claim 9 wherein the central portion of said optical fibers are predeterminedly positioned at the focal length of their respective lens elements.

32. A lighting subsystem in accordance with claim 28 wherein said light source is located and one of the focal points of said elliptical reflector and the optical fibers are located at the other focal point of said elliptical reflector.

[33. A lighting subsystem in accordance with claim 9 wherein said high intensity light source is a high intensity discharge lamp.]

34. A lighting subsystem in accordance with claim 9 wherein said lens elements are of an aspheric type lens having an F/number in the range of about 0.6 to about 1.0.

[35. A lighting subsystem in accordance with claim 3 wherein said high intensity light source is a high intensity discharge lamp.]

36. A lighting subsystem in accordance with claim 3 wherein said lens elements are of an aspheric type lens having a F/number in the range of about 0.6 to about 1.0.

37. A lighting system for a vehicle comprising;

(a) a first subsystem comprising a first high intensity light source capable of being selectively energized and coupled to one end of each of a first plurality of optical fibers;

(b) a second subsystem comprising a second high intensity light source capable of being energized and coupled to one end of each of a second plurality of optical fibers;

(c) a third subsystem comprising a third high intensity light source capable of being selectively energized along with said first high intensity light source and coupled to one end of each of a third plurality of optical fibers;

(d) a fourth subsystem comprising a fourth high intensity light source capable of being energized along with said second light source and coupled to one end of each of a fourth plurality of optical fibers.

(e) a first plurality of reflective elements predeterminedly and respectively located relative to the other ends of said first and third plurality of optical fibers;

(f) a second plurality of reflective elements predeterminedly and respectively located relative to the other ends of said second and fourth plurality of optical fibers;

(g) a first plurality of lens elements predeterminedly and respectively located relative to said first plurality of reflective elements, said first and third plurality of optical fibers being positioned relative to the center line of their respective lens elements by an angle in the range of about three (3) to five (5) degrees so as to provide a low beam illumination pattern upon the energization of either or both of said first and third light sources, said first plurality of lens elements being mountable across a portion of the frontal area of said vehicle; and (h) a second plurality of lens elements predeterminedly and respectively located relative to said second plurality of reflective elements, said second and fourth plurality of optical fibers being positioned to correspond, in a perpendicular manner, to the center line of their respective lens elements so as to provide a high beam illumination pattern upon the energization of either or both of said second and fourth light sources, said second plurality of lens elements being mountable across another portion of said frontal area of said vehicle.

38. A lighting system according to claim 37 wherein said high intensity light source is an incandescent filament tube.

39. A lighting system according to claim 37 wherein said high intensity light source is a high intensity [light source] *discharge lamp.*

40. A lighting system for a vehicle comprising;

(a) a first subsystem comprising a first high intensity light source capable of being selectively energized and coupled to one end of each of a first plurality of optical fibers;

(b) a second subsystem comprising a second high intensity light source capable of being energized and coupled to one end of each of a second plurality of optical fibers;

(c) a third subsystem comprising a third high intensity light source capable of being selectively energized along with said firs high intensity light source and coupled to one end of each of a third of plurality of optical fibers;

(d) a fourth subsystem comprising a fourth high intensity light source capable of being energized along with said second light source and coupled to one end of each of a fourth plurality of optical fibers;

(e) a first plurality of lens elements related to said first and third plurality of optical fibers, said first and third plurality of optical fibers being positioned relative to the center line of their respective lens element members by an angle in the range of about three (3) to five (5) degrees so as to provide a low beam illumination pattern upon the energization of either or both of said first and third light sources, said first plurality of lens elements being mountable across a portion of the frontal area of said vehicle; and (f) a second plurality of lens elements related to said second and fourth plurality of optical fibers, said second and fourth plurality of optical fibers being positioned to correspond, in a perpendicular manner, to the center line of their respective lens element so as to provide a high beam illumination pattern upon the energization of either or both of said second and fourth light sources, said second plurality of lens elements being mountable across another portion of said frontal area of said vehicle.

41. A lighting system according to claim 40 wherein said high intensity light source is an incandescent filament tube.

42. A lighting system according to claim 40 wherein said high intensity light source is a high intensity [light source] *discharge lamp.*

*43. A lighting system for a vehicle comprising:*

*(a) a high intensity light capable of being selectably energized, said high intensity light source being a discharge lamp and having a discharge arc formed therein;*

*(b) a plurality of optical carrying devices each having an input end disposed in proximate relation to said discharge arc such that light output from said discharge arc is efficiently coupled to said input ends of each of said plurality of optical carrying devices, said optical carrying devices each having their respective other ends mountable in the frontal area of the vehicle, said optical carrying devices providing the frontal illumination pattern of the vehicle when said light source is activated;*

*(c) wherein said input ends said plurality of optical carrying devices are combined in a manner so as to result in a cross sectional area of a predetermined dimension; and,*

*(d) a reflector member in which light from said high intensity discharge lamp is reflected into a pattern across substantially all of said cross-sectional area formed by said combined input ends of said plurality of optical carrying devices.*

*44. A vehicle lighting system as set forth in claim 43 wherein said pattern of light reflected across substantially all of said cross-sectional area is applied substantially uniformly across said cross sectional area such that each of said input ends receives substantially the same intensity of light input thereto.*

* * * * *